United States Patent Office 2,947,641
Patented Aug. 2, 1960

2,947,641
SHELL MOLDING MATERIAL AND PROCESS

Julius M. Bleuenstein, Dearborn, Mich., assignor to Ford Motor Company, Dearborn, Mich., a corporation of Delaware No Drawing. Filed Nov. 3, 1958, Ser. No. 771,236

9 Claims. (Cl. 106—38.3)

This invention relates in general to the founding operation known as shell molding and is more specifically directed to a completely inorganic shell molding composition devoid of all plastic resins. The absence of organic resins renders this shell molding material considerably more economical to produce.

The production of the shell molding sand described in this invention is predicated upon my discovery that certain of the hydrated alkali metal metasilicates exhibit a very low melting point. For example, the melting point of sodium metasilicate enneahydrate is reported at 47° C. and the corresponding potassium salt monohydrate at 200° C. with the potassium disilicate monohydrate melting at about 270° C. These low melting points permit these hydrated alkali metal metasilicates to function in a manner similar to the phenol aldehyde resins currently in widespread commercial use. Such resins when mixed into or coated upon sand and placed in contact with a heated metal pattern melt or soften and bind together the sand particles to form a shell. This phenomenon takes place equally well with the low melting alkali metal hydrated metasilicates, i.e., those with a melting point not substantially above about 400° C.

As a specific example of this invention a solution was prepared of 11 parts of sodium metasilicate enneahydrate in 5 parts of water. 500 grams of this solution was added to 10 pounds of bank sand (AFS 100) and mixed in a muller for about 10 minutes. At the expiration of this length of time the material had changed to a dry pulverulent readily flowable material. If desired any of the well known waxes or lubricants may be added to the sand to improve its flow characteristics.

This mix when cured on a hot pattern at 310° F. for 2 minutes had a tensile strength of 290 p.s.i. and a tensile strength of 310 p.s.i. when cured at 410° F. for 1 minute. This mixture seemed to be completely satisfactory for shell molding processes including blowing or shooting processes in which a long travel of the sand through restricted space in the pattern was necessary.

While this specific example is directed to sand and sodium metasilicate enneahydrate, it is to be understood that any of the well known molding materials such as zirconia, alumina, graphite, etc. may be substituted and any hydrated alkali metal metasilicate exhibiting a melting point low enough to partially melt at feasible pattern temperatures may be employed. It is to be understood that in the appended claims reference to an alkali metal metasilicate is to be understood to include a mixture of such metasilicates.

I claim as my invention:

1. A dry, pulverulent, readily flowable shell molding material consisting essentially of a granular refractory material admixed with a small but effective amount of a hydrated silicate of an alkali metal, said alkali metal hydrated silicate exhibiting a melting point not substantially above that of $K_2O.2SiO_2.H_2O$.

2. A dry, pulverulent, readily flowable shell molding material consisting essentially of a granular refractory material admixed with a small but effective amount of a hydrated silicate of an alkali metal, said alkali metal hydrated silicate exhibiting a melting point not substantially above about 400° C.

3. A dry, pulverulent, readily flowable shell molding material consisting essentially of a granular refractory material coated with a small but effective amount of a hydrated silicate of an alkali metal, said alkali metal hydrated silicate exhibiting a melting point not substantially above that of $K_2O.2SiO_2.H_2O$.

4. A dry, pulverulent, readily flowable shell molding material consisting essentially of a granular refractory material coated with a small but effective amount of a hydrated silicate of an alkali metal, said alkali metal hydrated silicate exhibiting a melting point not substantially above about 400° C.

5. A dry, pulverulent, readily flowable shell molding material consisting essentially of a granular refractory material admixed with a small but effective amount of sodium metasilicate enneahydrate.

6. A dry, pulverulent, readily flowable shell molding material consisting essentially of a granular refractory material coated with a small but effective amount of sodium metasilicate enneahydrate.

7. The process of preparing a shell molding material comprising adding to a granular refractory material a small but effective amount of a mixture of water and an alkali metal hydrated silicate which silicate exhibits a melting point not substantially in excess of that of $K_2O.2SiO_2.H_2O$, and continuing the mixing until a dry, free flowing material is obtained.

8. The process of preparing a shell molding material comprising adding to a granular refractory material a small but effective amount of a mixture of water and sodium metasilicate enneahydrate, and continuing the mixing until a dry, free flowing material is obtained.

9. The process of preparing a shell molding material comprising adding to ten pounds of bank sand having an AFS size No. 100 500 grams of a mixture of 11 parts of sodium metasilicate enneahydrate and five parts of water and mulling the mixture until a dry, free flowing material is obtained.

References Cited in the file of this patent

UNITED STATES PATENTS

| | | |
|---|---|---|
| 1,889,007 | Wallace | Nov. 29, 1932 |
| 1,956,895 | Charman | May 1, 1934 |
| 1,976,009 | Bat | Oct. 9, 1934 |
| 2,292,199 | Carter | Aug. 4, 1942 |
| 2,378,927 | Jewett | June 26, 1945 |
| 2,521,839 | Feagin | Sept. 12, 1950 |
| 2,701,902 | Strachan | Feb. 15, 1955 |
| 2,749,586 | Kohl et al. | June 12, 1956 |
| 2,790,722 | Kohl et al. | Apr. 30, 1957 |

OTHER REFERENCES

Vail: "Soluble Silicates," vol. I (1952), pub. by Reinhold, N.Y.C. (pp. 138, 139, 149 and 150). Copy in Sci. Libr.